(12) United States Patent
Meng

(10) Patent No.: US 10,404,691 B2
(45) Date of Patent: Sep. 3, 2019

(54) PREVENTING UNAUTHORIZED ACCESS TO SECURED INFORMATION SYSTEMS USING AUTHENTICATION TOKENS

(71) Applicant: Bank of America Corporation, Charlotte, NC (US)

(72) Inventor: Wenhui Meng, Bothell, WA (US)

(73) Assignee: Bank of America Corporation, Charlotte, NC (US)

( * ) Notice: Subject to any disclaimer, the term of this patent is extended or adjusted under 35 U.S.C. 154(b) by 204 days.

(21) Appl. No.: 15/447,816

(22) Filed: Mar. 2, 2017

(65) Prior Publication Data

US 2018/0255052 A1    Sep. 6, 2018

(51) Int. Cl.
| | | |
|---|---|---|
| *H04L 9/00* | (2006.01) | |
| *G06F 21/00* | (2013.01) | |
| *H04L 29/06* | (2006.01) | |
| *G06F 1/14* | (2006.01) | |
| *G06F 1/12* | (2006.01) | |

(52) U.S. Cl.
CPC ............ *H04L 63/0838* (2013.01); *G06F 1/12* (2013.01); *G06F 1/14* (2013.01); *H04L 63/0846* (2013.01)

(58) Field of Classification Search
None
See application file for complete search history.

(56) References Cited

U.S. PATENT DOCUMENTS

| | | | |
|---|---|---|---|
| 8,639,926 B2 | 1/2014 | Brown et al. | |
| 8,769,651 B2 | 7/2014 | Grajek et al. | |
| 9,245,103 B2 | 1/2016 | Burch et al. | |
| 9,332,008 B2 | 5/2016 | Burch et al. | |
| 2007/0133591 A1 | 6/2007 | Shatford | |
| 2011/0289576 A1* | 11/2011 | Cheng | G09C 1/00 726/9 |
| 2016/0105426 A1* | 4/2016 | Noh | H04L 63/0838 726/6 |
| 2016/0315771 A1* | 10/2016 | Chalamala | H04L 9/321 |
| 2016/0342960 A1 | 11/2016 | Hulbert et al. | |
| 2016/0342971 A1 | 11/2016 | Hulbert et al. | |
| 2016/0342991 A1 | 11/2016 | Narasimhan et al. | |
| 2016/0350544 A1 | 12/2016 | Wong | |

(Continued)

*Primary Examiner* — Alexander Lagor
(74) *Attorney, Agent, or Firm* — Banner & Witcoff, Ltd.; Michael A. Springs

(57) ABSTRACT

Aspects of the disclosure relate to providing information security and preventing unauthorized access to secured resources by implementing token-based authentication techniques. A computing platform may receive, from a client computing device, a request to authenticate a user to a user account associated with a client portal provided by a client portal server. In response to receiving the request to authenticate, the computing platform may generate a validation token for the user account. Subsequently, the computing platform may validate the request to authenticate based on the validation token generated for the user account. In response to validating the request to authenticate, the computing platform may generate and send one or more commands directing the client portal server to provide at least one client portal interface to the client computing device. In some instances, receiving the request to authenticate may include receiving a time-based one-time passcode generated by the client computing device.

20 Claims, 8 Drawing Sheets

(56) References Cited

U.S. PATENT DOCUMENTS

| | | |
|---|---|---|
| 2016/0350747 A1 | 12/2016 | Pruthi et al. |
| 2016/0350748 A1 | 12/2016 | Pruthi et al. |
| 2016/0350751 A1 | 12/2016 | Keys et al. |
| 2016/0353170 A1 | 12/2016 | Casey et al. |
| 2016/0358157 A1 | 12/2016 | Khan et al. |
| 2016/0358167 A1 | 12/2016 | Van Os et al. |
| 2016/0358168 A1 | 12/2016 | Van Os et al. |
| 2016/0358199 A1 | 12/2016 | Van Os et al. |
| 2016/0359629 A1 | 12/2016 | Nadathur et al. |
| 2016/0359837 A1 | 12/2016 | Krstic et al. |
| 2016/0359863 A1 | 12/2016 | Krstic et al. |
| 2016/0360257 A1 | 12/2016 | Licence et al. |
| 2016/0364723 A1 | 12/2016 | Reese et al. |
| 2016/0364729 A1 | 12/2016 | Ruparelia et al. |
| 2016/0376140 A1 | 12/2016 | Tansey, Jr. |
| 2016/0378558 A1 | 12/2016 | LaMantia et al. |
| 2016/0379211 A1 | 12/2016 | Hoyos et al. |
| 2016/0380976 A1 | 12/2016 | Dhandayuthapani et al. |
| 2016/0381080 A1 | 12/2016 | Reddem et al. |
| 2017/0003938 A1 | 1/2017 | Gulkis |
| 2017/0003954 A1 | 1/2017 | Khan et al. |
| 2017/0005998 A1 | 1/2017 | Gupta |
| 2017/0006028 A1 | 1/2017 | Tunnell et al. |
| 2017/0009417 A1 | 1/2017 | High et al. |
| 2017/0010609 A1 | 1/2017 | High et al. |
| 2017/0010610 A1 | 1/2017 | Atchley et al. |
| 2017/0011172 A1 | 1/2017 | Raduchel |
| 2017/0011406 A1 | 1/2017 | Tunnell et al. |
| 2017/0011573 A1 | 1/2017 | Belhadia et al. |
| 2017/0020354 A1 | 1/2017 | High et al. |
| 2017/0024733 A1 | 1/2017 | Purves |
| 2017/0024742 A1 | 1/2017 | Khan et al. |
| 2017/0026182 A1 | 1/2017 | Sauerwald et al. |
| 2017/0026830 A1 | 1/2017 | Singh et al. |
| 2017/0031860 A1 | 2/2017 | Hulbert et al. |
| 2017/0031861 A1 | 2/2017 | Hulbert et al. |
| 2017/0034141 A1 | 2/2017 | Oberheide et al. |
| 2017/0034718 A1 | 2/2017 | Fan et al. |
| 2017/0039597 A1 | 2/2017 | Trinh |
| 2017/0039630 A1 | 2/2017 | Daigle |
| 2017/0041879 A1 | 2/2017 | Su et al. |
| 2017/0046506 A1 | 2/2017 | Fujii et al. |
| 2017/0046679 A1 | 2/2017 | Gotlieb et al. |
| 2017/0048204 A9 | 2/2017 | Barton et al. |
| 2017/0048257 A1 | 2/2017 | Hamid |
| 2017/0048279 A1 | 2/2017 | Brannon et al. |

\* cited by examiner

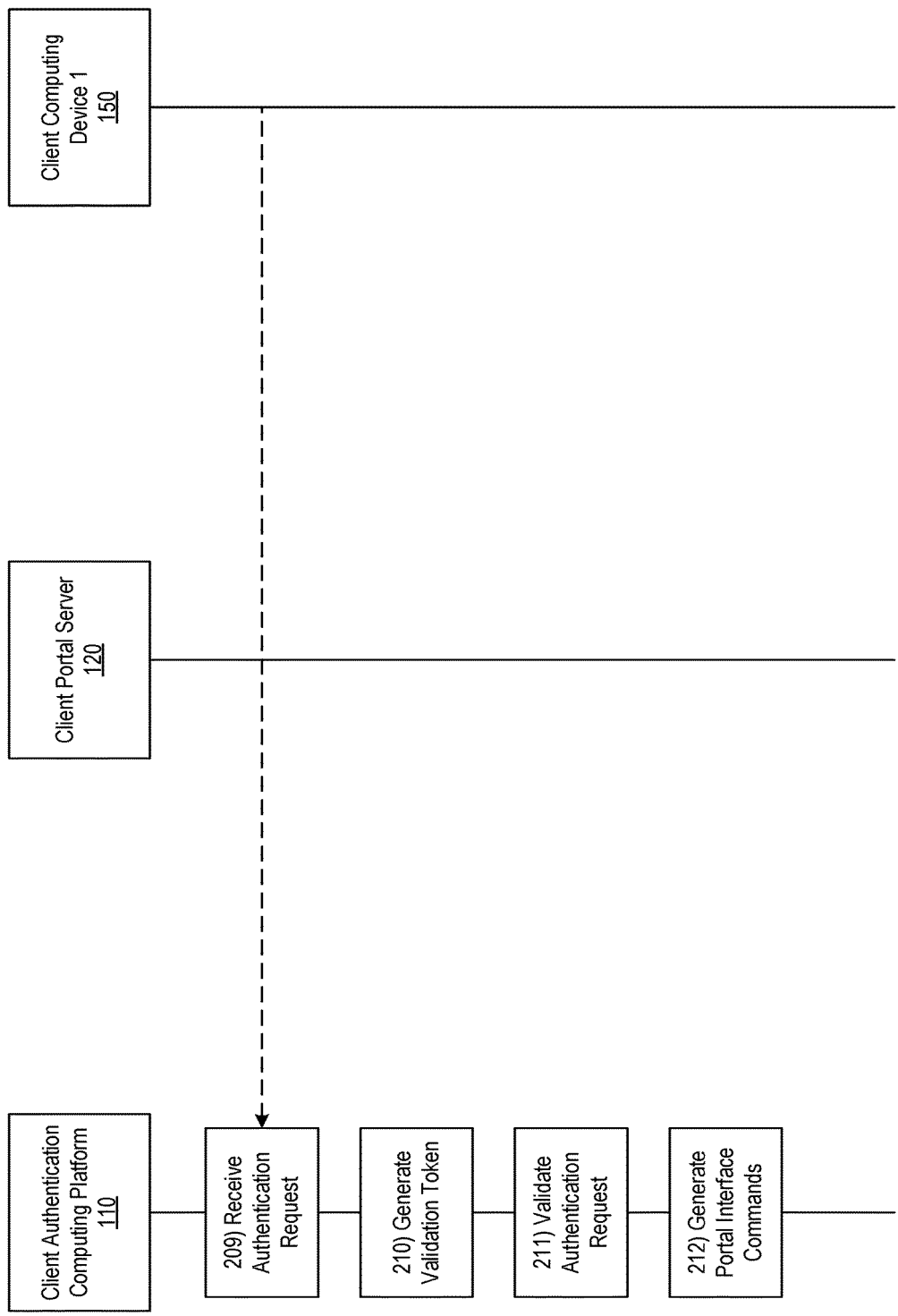

PREVENTING UNAUTHORIZED ACCESS TO SECURED INFORMATION SYSTEMS USING AUTHENTICATION TOKENS

BACKGROUND

Aspects of the disclosure relate to providing information security and preventing unauthorized access to resources of an information system. In particular, one or more aspects of the disclosure relate to preventing unauthorized access to secured information systems using authentication tokens.

As organizations increasingly provide electronic portals via which various users may access, view, and/or modify information, including client information, ensuring the safety and security of information maintained by such organizations and/or made available via such portals is increasingly important. In many instances, however, it may be difficult to ensure the safety and security of such information while also optimizing the efficient and effective technical operations of the computer systems that maintain such information and/or provide such portals.

SUMMARY

Aspects of the disclosure provide effective, efficient, scalable, and convenient technical solutions that address and overcome the technical problems associated with providing information security and preventing unauthorized access to resources of an information system by implementing token-based authentication techniques.

In accordance with one or more embodiments, a computing platform having at least one processor, a memory, and a communication interface may receive, via the communication interface, from a client computing device, a request to authenticate a user to a user account associated with a client portal provided by a client portal server. In response to receiving the request to authenticate the user to the user account associated with the client portal provided by the client portal server from the client computing device, the computing platform may generate a validation token for the user account associated with the client portal provided by the client portal server. Subsequently, the computing platform may validate the request to authenticate the user to the user account associated with the client portal provided by the client portal server received from the client computing device based on the validation token generated for the user account associated with the client portal provided by the client portal server. In response to validating the request to authenticate the user to the user account associated with the client portal provided by the client portal server received from the client computing device based on the validation token generated for the user account associated with the client portal provided by the client portal server, the computing platform may generate one or more commands directing the client portal server to provide at least one client portal interface to the client computing device. Subsequently, the computing platform may send, via the communication interface, to the client portal server, the one or more commands directing the client portal server to provide the at least one client portal interface to the client computing device.

In some embodiments, receiving the request to authenticate the user to the user account associated with the client portal provided by the client portal server may include receiving a username corresponding to the user account and a time-based one-time passcode generated by the client computing device. In some instances, the time-based one-time passcode may be generated by the client computing device based on password input received by the client computing device. In some instances, the time-based one-time passcode may be generated by the client computing device after the client computing device synchronizes a clock maintained by the client computing device with a clock maintained by the computing platform. In some instances, the time-based one-time passcode may be generated by the client computing device after the client computing device synchronizes a clock maintained by the client computing device with a clock maintained by a time server.

In some embodiments, generating the validation token for the user account associated with the client portal provided by the client portal server may include generating a validation passcode based on a current time and a stored user account password associated with the user account associated with the client portal provided by the client portal server.

In some embodiments, validating the request to authenticate the user to the user account associated with the client portal provided by the client portal server may include comparing the validation token generated for the user account associated with the client portal provided by the client portal server with a time-based one-time passcode generated by the client computing device.

In some embodiments, prior to receiving the request to authenticate the user to the user account associated with the client portal provided by the client portal server from the client computing device, the computing platform may receive profile information defining a new user account password for the user account associated with the client portal provided by the client portal server during an authenticated session. Subsequently, the computing platform may store the new user account password for the user account associated with the client portal provided by the client portal server.

In some embodiments, in response to receiving the profile information defining the new user account password for the user account associated with the client portal provided by the client portal server during the authenticated session, the computing platform may send, via the communication interface, to the client computing device, at least one clock synchronization command directing the client computing device to synchronize a clock maintained by the client computing device with a clock maintained by another server.

In some embodiments, in response to failing to validate the request to authenticate the user to the user account associated with the client portal provided by the client portal server received from the client computing device based on the validation token generated for the user account associated with the client portal provided by the client portal server, the computing platform may send at least one error message to the client computing device.

In some embodiments, the computing platform may receive, via the communication interface, from the client portal server, one or more client portal user interfaces generated by the client portal server for the client computing device. Subsequently, the computing platform may send, via the communication interface, to the client computing device, the one or more client portal user interfaces generated by the client portal server for the client computing device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2D depict an illustrative event sequence for preventing unauthorized access to secured information systems using authentication tokens in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to preventing unauthorized access to secured information systems using authentication tokens. In some username-password authentication methods, the password has to be sent to the server for verification, and the password may be lost during the transit. Avoiding sending the password in the request may, for instance, help reduce the risk of losing the password. As illustrated in one or more examples discussed in greater detail below, the client side, which may be a browser or an application, may use the password as a seed to generate a time-based one-time token (T-OTP), which may be valid for a specified time span, such as thirty seconds. The T-OTP may replace the password in the authentication request along with the username. When the server receives the authentication request with the username and the T-OTP, the server may use the same algorithm to generate a T-OTP with the password saved on the server-side, and then perform verification based on the generated T-OTP and the received T-OTP, for example.

Figure 1A:
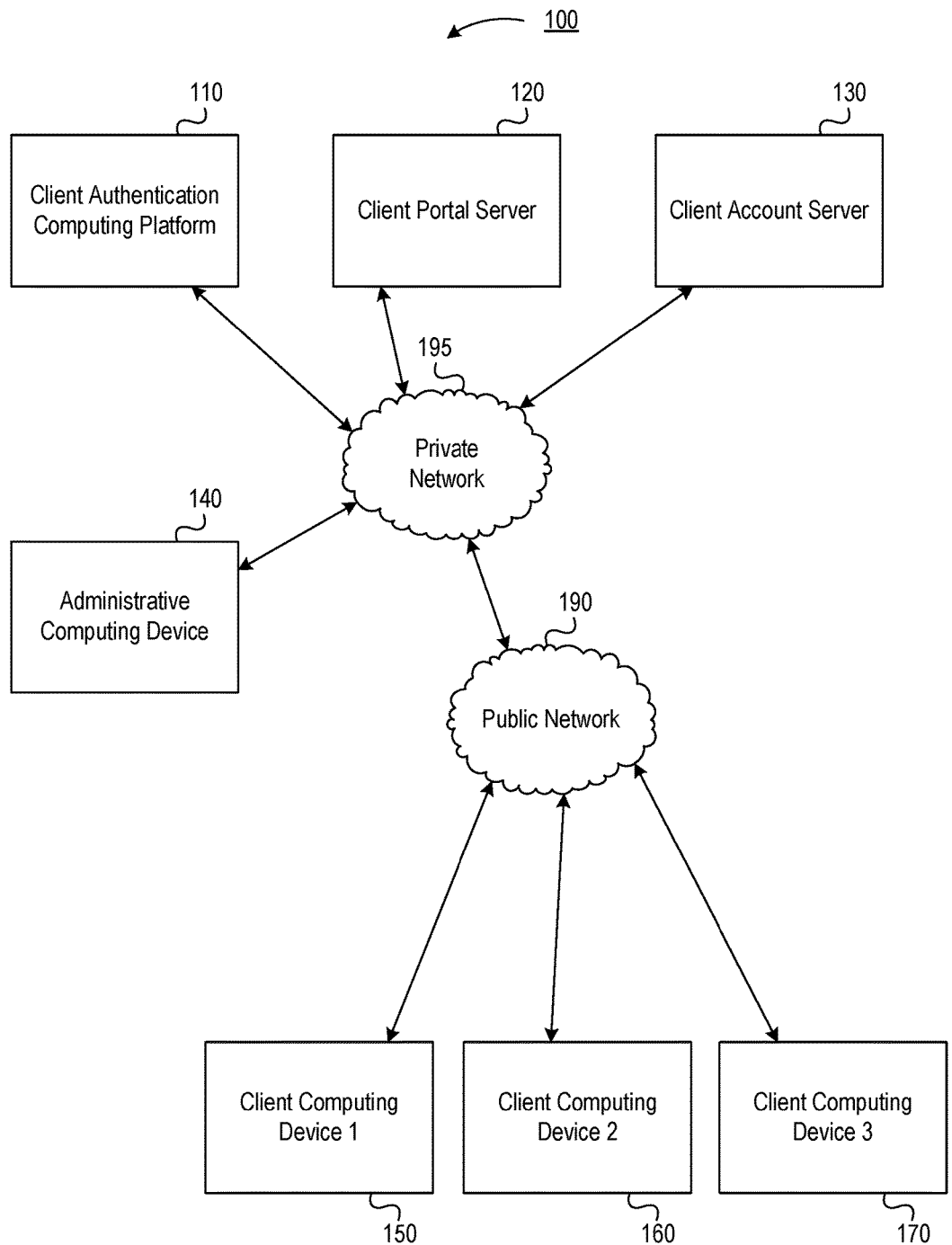
FIGS. 1A and 1B depict an illustrative computing environment for preventing unauthorized access to secured information systems using authentication tokens in accordance with one or more example embodiments.
Figure 1B:
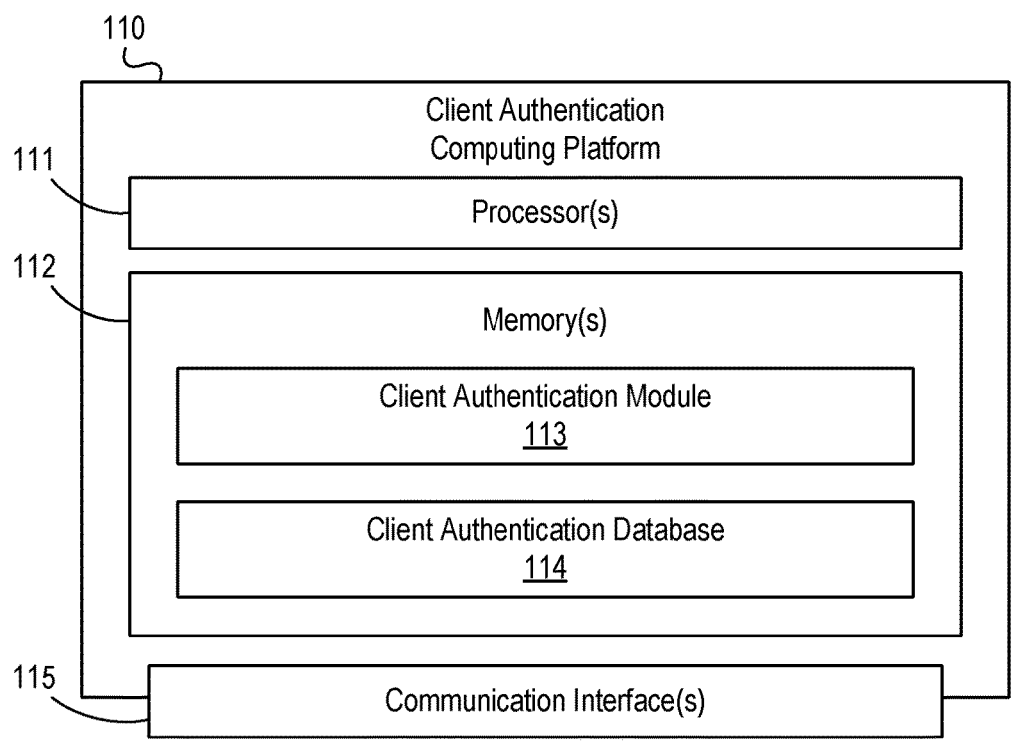

FIGS. 1A and 1B depict an illustrative computing environment for preventing unauthorized access to secured information systems using authentication tokens in accordance with one or more example embodiments. Referring to FIG. 1A, computing environment 100 may include one or more computing devices. For example, computing environment 100 may include a client portal server 120, a client account server 130, an administrative computing device 140, a first client computing device 150, a second client computing device 160, and a third client computing device 170.

Client portal server 120 may be configured to provide one or more portal interfaces to one or more client devices. For example, client portal server 120 may be configured to provide a customer portal, such as an online banking portal, to one or more customers of an organization, such as a financial institution, who may use one or more client computing devices to access the portal, such as client computing device 150, client computing device 160, and client computing device 170, as illustrated in greater detail below. In some instances, in addition to being configured to provide an online banking portal associated with a financial institution to one or more customers of the financial institution and/or their associated computing devices, client portal server 120 also may be configured to provide a mobile banking portal associated with the financial institution to various customers of the financial institution and/or their associated mobile computing devices. Such portals may, for instance, provide customers of the financial institution with access to financial account information (e.g., account balance information, account statements, recent transaction history information, or the like) and/or may provide customers of the financial institution with menus, controls, and/or other options to schedule and/or execute various transactions (e.g., online bill pay transactions, person-to-person funds transfer transactions, or the like).

Client account server 130 may be configured to store and/or maintain information associated with one or more client accounts. For example, client account server 130 may be configured to store and/or maintain information associated with one or more financial accounts associated with one or more customers of a financial institution, such as account balance information, transaction history information, and/or the like. Additionally or alternatively, client account server 130 may include and/or integrate with one or more client support servers and/or devices, such as one or more customer service representative devices used by one or more customer service representatives of an organization (which may, e.g., be a financial institution operating client portal server 120), to connect one or more customers of the organization with one or more customer service representatives of the organization via one or more telephone support sessions, chat support sessions, and/or other client support sessions.

Administrative computing device 140 may be configured to provide one or more interfaces that allow for configuration and management of one or more other computing devices and/or computer systems included in computing environment 100. Client computing device 150 may be configured to be used by a first customer of an organization, such as a financial institution. In some instances, client computing device 150 may, for example, be registered with the organization and/or one or more computer systems in computing environment 100, such that the organization and/or the one or more computer systems maintain one or more records linking client computing device 150 to the first customer of the organization, as illustrated in greater detail below. Client computing device 160 may be configured to be used by a second customer of the organization (who may, e.g., be different from the first customer of the organization). In some instances, client computing device 160 may, for example, be registered with the organization and/or one or more computer systems in computing environment 100, such that the organization and/or the one or more computer systems maintain one or more records linking client computing device 160 to the second customer of the organization, as illustrated in greater detail below. Client computing device 170 may be configured to be used by a third customer of the organization (who may, e.g., be different from the first customer of the organization and the second customer of the organization). In some instances, client computing device 170 may, for example, be registered with the organization and/or one or more computer systems in computing environment 100, such that the organization and/or the one or more computer systems maintain one or more records linking client computing device 170 to the third customer of the organization, as illustrated in greater detail below.

In one or more arrangements, client portal server 120, client account server 130, administrative computing device 140, client computing device 150, client computing device 160, and client computing device 170 may be any type of computing device capable of receiving a user interface, receiving input via the user interface, and communicating the received input to one or more other computing devices. For example, client portal server 120, client account server 130, administrative computing device 140, client computing device 150, client computing device 160, and client computing device 170 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of client portal server 120, client account server 130, administrative computing device 140, client computing device 150, client computing device 160, and client computing device 170 may, in some instances, be special-purpose computing devices configured to perform specific functions.

Computing environment 100 also may include one or more computing platforms. For example, computing environment 100 may include client authentication computing platform 110. As illustrated in greater detail below, client authentication computing platform 110 may include one or more computing devices configured to perform one or more of the functions described herein. For example, client authentication computing platform 110 may include one or more computers (e.g., laptop computers, desktop computers, servers, server blades, or the like).

Computing environment 100 also may include one or more networks, which may interconnect one or more of client authentication computing platform 110, client portal server 120, client account server 130, administrative computing device 140, client computing device 150, client computing device 160, and client computing device 170. For example, computing environment 100 may include public network 190 and private network 195. Private network 195 and/or public network 190 may include one or more sub-networks (e.g., local area networks (LANs), wide area networks (WANs), or the like). Private network 195 may be associated with a particular organization (e.g., a corporation, financial institution, educational institution, governmental institution, or the like) and may interconnect one or more computing devices associated with the organization. For example, client authentication computing platform 110, client portal server 120, client account server 130, and administrative computing device 140 may be associated with an organization (e.g., a financial institution), and private network 195 may be associated with and/or operated by the organization, and may include one or more networks (e.g., LANs, WANs, virtual private networks (VPNs), or the like) that interconnect client authentication computing platform 110, client portal server 120, client account server 130, and administrative computing device 140 and one or more other computing devices and/or computer systems that are used by, operated by, and/or otherwise associated with the organization. Public network 190 may connect private network 195 and/or one or more computing devices connected thereto (e.g., client authentication computing platform 110, client portal server 120, client account server 130, and administrative computing device 140) with one or more networks and/or computing devices that are not associated with the organization. For example, client computing device 150, client computing device 160, and client computing device 170 might not be associated with an organization that operates private network 195 (e.g., because client computing device 150, client computing device 160, and client computing device 170 may be owned, operated, and/or serviced by one or more entities different from the organization that operates private network 195, such as one or more customers of the organization and/or vendors of the organization, rather than being owned and/or operated by the organization itself or an employee or affiliate of the organization), and public network 190 may include one or more networks (e.g., the internet) that connect client computing device 150, client computing device 160, and client computing device 170 to private network 195 and/or one or more computing devices connected thereto (e.g., client authentication computing platform 110, client portal server 120, client account server 130, and administrative computing device 140).

Referring to FIG. 1B, client authentication computing platform 110 may include one or more processors 111, memory 112, and communication interface 115. A data bus may interconnect processor(s) 111, memory 112, and communication interface 115. Communication interface 115 may be a network interface configured to support communication between client authentication computing platform 110 and one or more networks (e.g., private network 195, public network 190, or the like). Memory 112 may include one or more program modules having instructions that when executed by processor(s) 111 cause client authentication computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of client authentication computing platform 110 and/or by different computing devices that may form and/or otherwise make up client authentication computing platform 110. For example, memory 112 may have, store, and/or include a client authentication module 113 and a client authentication database 114. Client authentication module 113 may have instructions that direct and/or cause client authentication computing platform 110 to authenticate one or more users and/or devices using token-based authentication techniques and/or to perform other functions, as discussed in greater detail below. Client authentication database 114 may store information used by client authentication module 113 and/or client authentication computing platform 110 in authenticating one or more users and/or devices using token-based authentication techniques and/or in performing other functions.

Figure 2A:
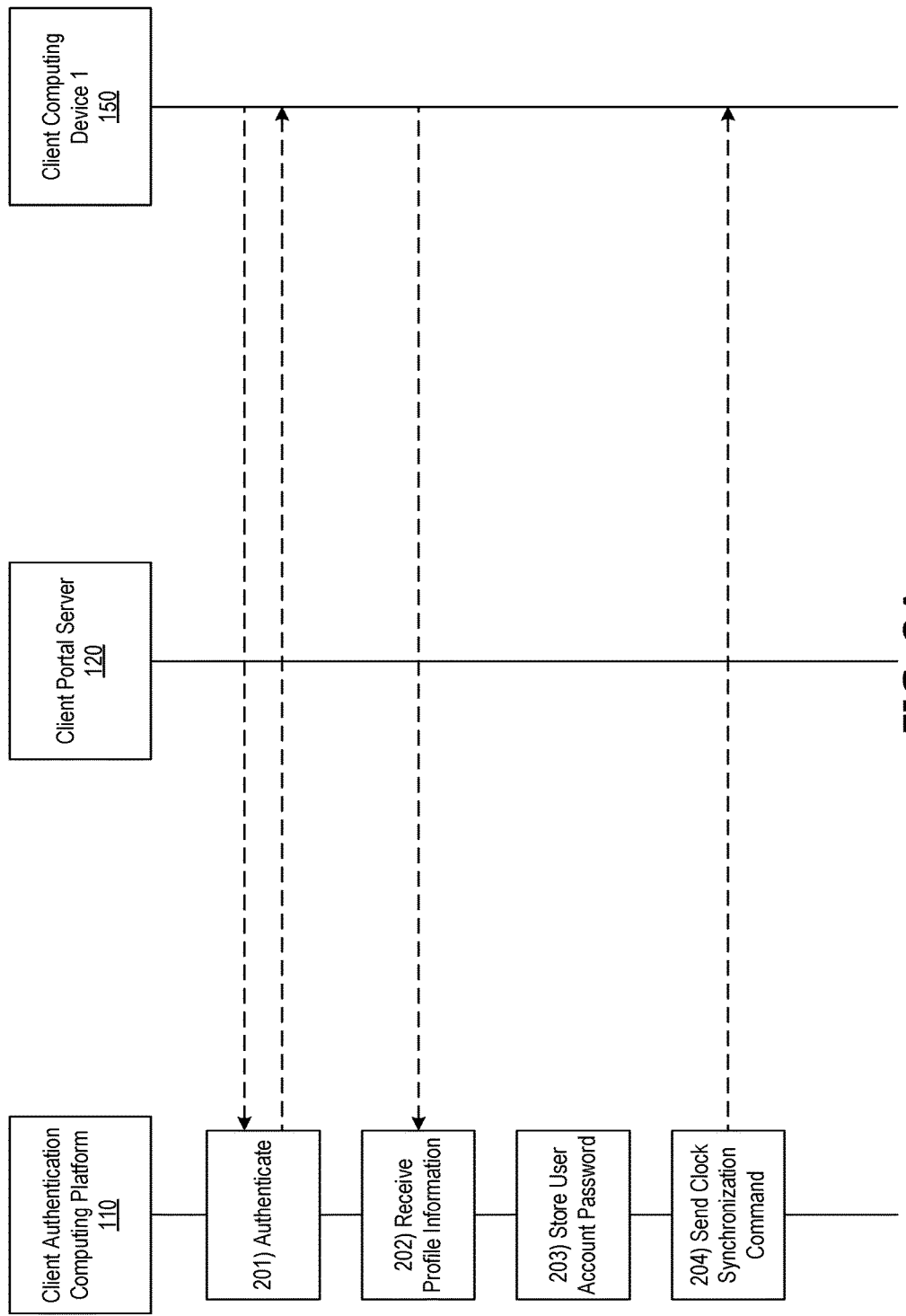

FIGS. 2A-2D depict an illustrative event sequence for preventing unauthorized access to secured information systems using authentication tokens in accordance with one or more example embodiments. Referring to FIG. 2A, at steps 201-204, client authentication computing platform 110 and client computing device 150 may perform a number of steps to complete an enrollment process in which client computing device 150 may enroll with client authentication computing platform 110 to enable token-based authentication. For example, client computing device 150 may authenticate with client authentication computing platform 110 and define a user account password, which client authentication computing platform 110 may save, and this user account password may be used as a seed in generating time-based one-time tokens on both client authentication computing platform 110 and client computing device 150, as illustrated in greater detail below.

Figure 3:
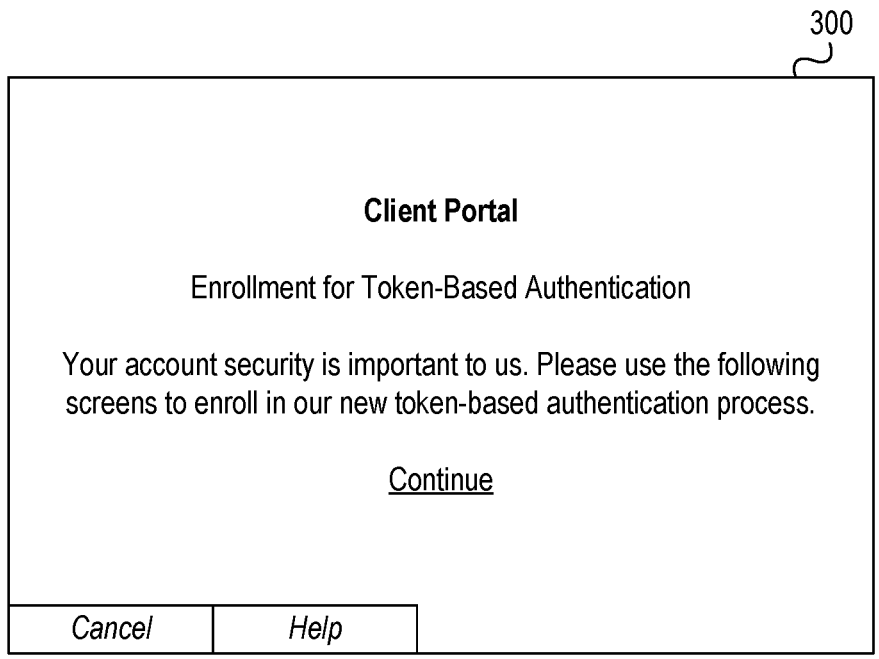
FIGS. 3 and 4 depict example graphical user interfaces for preventing unauthorized access to secured information systems using authentication tokens in accordance with one or more example embodiments.

At step 201, client authentication computing platform 110 may authenticate client computing device 150 and/or a user of client computing device 150 to establish and/or otherwise initiate an authenticated session with client computing device 150. Client authentication computing platform 110 may, for instance, authenticate client computing device 150 using a username-password authentication process, an initial authentication process, and/or another initial enrollment process. In some instances, such an initial authentication process and/or initial enrollment process may be triggered at client authentication computing platform 110 based on commands and/or other information received by client authentication computing platform 110 from client portal server 120. Additionally or alternatively, in authenticating client computing device 150 and/or the user of client computing device 150, client authentication computing platform 110 may direct and/or otherwise cause client computing device 150 to display and/or otherwise present a graphical user interface similar to graphical user interface 300, which is illustrated in FIG. 3. As seen in FIG. 3, graphical user interface 300 may include information explaining and/or prompting the user of client computing device 150 to enroll in a token-based authentication scheme implemented by client authentication computing platform 110 (e.g., "Your account security is important to us. Please use the following screens to enroll in our new token-based authentication process."). In addition, graphical user interface 300 may include one or more controls and/or other elements enabling a user of graphical user interface 300 and/or client computing device 150 to respond to the prompt (e.g., a continue link, a cancel button, a help button, and/or the like).

At step 202, client authentication computing platform 110 may receive profile information from client computing device 150. For example, at step 202, client authentication computing platform 110 may receive profile information from client computing device 150 defining a new user account password for a user account linked to and/or otherwise associated with client computing device 150 (e.g., based on user input received at client computing device 150 from the user of client computing device 150 specifying the new user account password) and/or other preferences for the user account. For instance, prior to receiving a request to authenticate a user to a user account associated with a client portal provided by a client portal server (e.g., client portal server 120) from a client computing device (e.g., client computing device 150), client authentication computing platform 110 may receive profile information defining a new user account password for the user account associated with the client portal provided by the client portal server (e.g., client portal server 120) during an authenticated session (e.g., with client computing device 150). At step 203, client authentication computing platform 110 may store a user account password included in the profile information received from client computing device 150. For example, at step 203, client authentication computing platform 110 may store the new user account password for the user account associated with the client portal provided by the client portal server (e.g., client portal server 120).

At step 204, client authentication computing platform 110 may send one or more clock synchronization commands to client computing device 150. Such clock synchronization commands may, for instance, direct and/or otherwise cause client computing device 150 to synchronize a clock maintained by client computing device 150 with a clock maintained by client authentication computing platform 110 and/or another predefined source (e.g., an internet time server). It may be important for client authentication computing platform 110 and client computing device 150 to have relatively synchronized clocks, as both client authentication computing platform 110 and client computing device 150 may use their own current system time in generating time-based one-time passcodes for authentication and validation purposes, as illustrated in greater detail below. Thus, by sending such clock synchronization commands to client computing device 150, client authentication computing platform 110 may enable one or more of the time-based one-time passcode authentication methods discussed in greater detail below. For example, at step 204, in response to receiving the profile information defining the new user account password for the user account associated with the client portal provided by the client portal server (e.g., client portal server 120) during the authenticated session (e.g., at step 202), client authentication computing platform 110 may send, via the communication interface (e.g., communication interface 115), to the client computing device (e.g., client computing device 150), at least one clock synchronization command directing the client computing device (e.g., client computing device 150) to synchronize a clock maintained by the client computing device (e.g., client computing device 150) with a clock maintained by another server (e.g., client authentication computing platform 110, an internet time server, and/or one or more other servers).

After the initial enrollment process performed at steps 201 to 204, client computing device 150 and client authentication computing platform 110 may conclude and/or otherwise terminate their authenticated session. Subsequently, some amount of time may pass, after which client computing device 150 may again request to connect to and/or authenticate with client authentication computing platform 110, which is illustrated in the example event sequence as beginning at step 205.

Figure 2B:
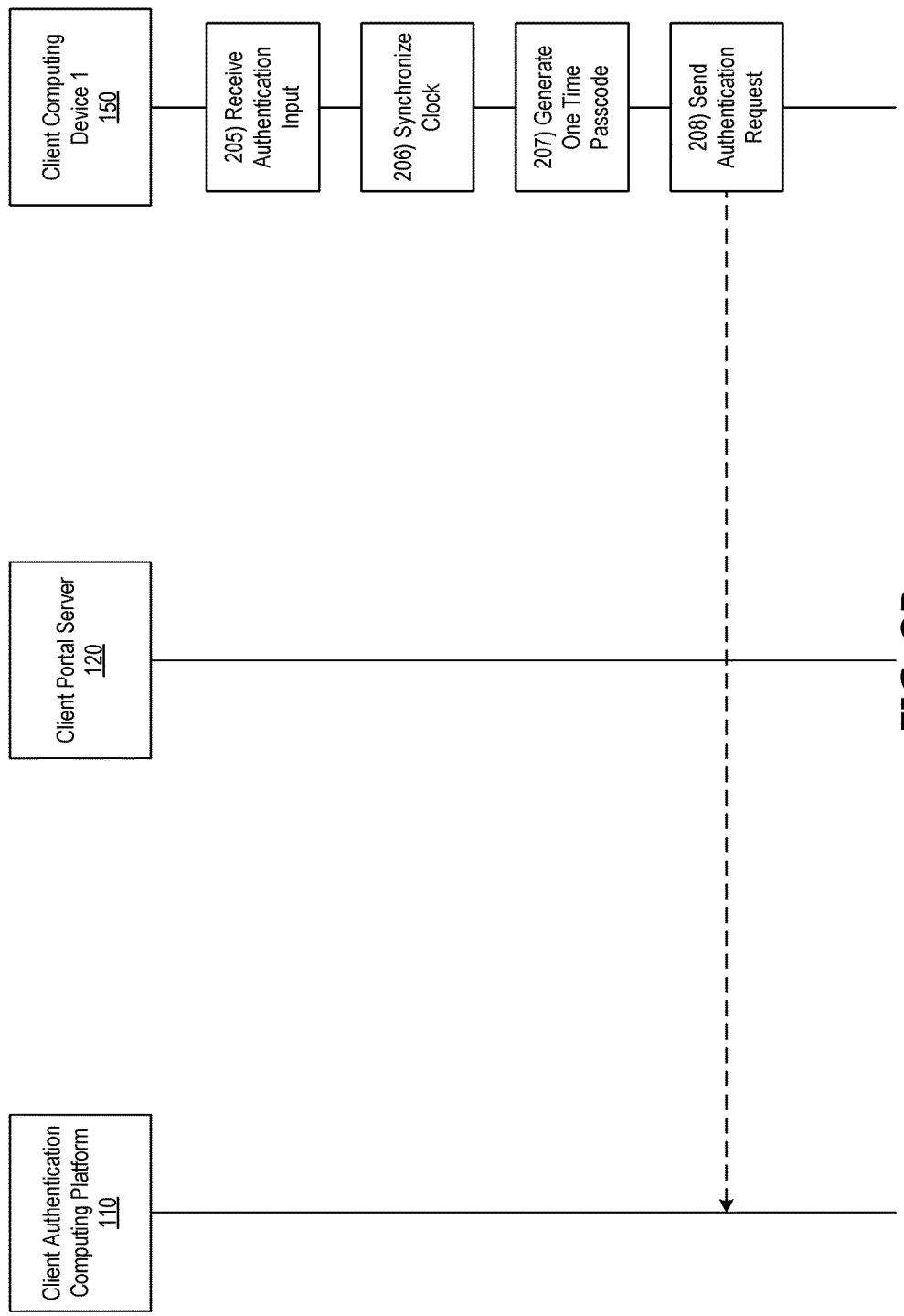

Referring to FIG. 2B, at step 205, client computing device 150 may receive authentication input. For example, at step 205, client computing device 150 may receive authentication input that includes a request to access a portal provided by client portal server 120, a username associated with a particular user account for accessing the portal provided by client portal server 120, password input for accessing the user account, and/or other input. At step 206, client computing device 150 may synchronize at least one clock maintained by client computing device 150 with client authentication computing platform 110, an internet time server, or another predefined source. In some instances, client computing device 150 may execute this clock synchronization based on the clock synchronization commands previously received from client authentication computing platform 110 (which may, e.g., have configured client computing device 150 to synchronize the at least one clock responsive to receiving authentication input from a user of client computing device 150).

At step 207, client computing device 150 may generate a one-time passcode. For example, at step 207, client computing device 150 may generate a time-based one-time passcode using one or more token generation algorithms, such as an OATH token generation algorithm. Client computing device 150 may, for instance, generate the one-time passcode based on the current system time maintained by client computing device 150 and the password input provided by a user of client computing device 150 (e.g., in providing the authentication input received by client computing device 150 at step 205). Client computing device 150 may, for instance, use such password input as a token seed parameter in executing the token generation algorithms. The one-time passcode generated by client computing device 150 may, for instance, be valid for a specific amount of time, such as ten seconds, one minute, five minutes and/or the like.

At step 208, client computing device 150 may generate and send an authentication request to client authentication computing platform 110. The authentication request may, for instance, include the one-time passcode generated by client computing device 150 and/or other information, such as the username corresponding to the user account to which client computing device 150 is requesting access.

Referring to FIG. 2C, at step 209, client authentication computing platform 110 may receive the authentication request from client computing device 150. For example, at step 209, client authentication computing platform 110 may receive, via the communication interface (e.g., communication interface 115), from a client computing device (e.g., client computing device 150), a request to authenticate a user to a user account associated with a client portal provided by a client portal server (e.g., client portal server 120).

In some embodiments, receiving the request to authenticate the user to the user account associated with the client portal provided by the client portal server may include receiving a username corresponding to the user account and a time-based one-time passcode generated by the client computing device. For example, in receiving the request to authenticate the user to the user account associated with the client portal provided by the client portal server (e.g., client portal server 120) at step 209, client authentication computing platform 110 may receive a username corresponding to the user account and a time-based one-time passcode generated by the client computing device (e.g., client computing device 150).

In some embodiments, the time-based one-time passcode may be generated by the client computing device based on password input received by the client computing device. For example, the time-based one-time passcode (which may, e.g., be included in the authentication request received by client authentication computing platform 110 from client computing device 150 at step 209) may be generated by the client computing device (e.g., client computing device 150) based on password input received by the client computing device (e.g., client computing device 150).

In some embodiments, the time-based one-time passcode may be generated by the client computing device after the client computing device synchronizes a clock maintained by the client computing device with a clock maintained by the computing platform. For example, the time-based one-time passcode (which may, e.g., be included in the authentication request received by client authentication computing platform 110 from client computing device 150 at step 209) may be generated by the client computing device (e.g., client computing device 150) after the client computing device (e.g., client computing device 150) synchronizes a clock maintained by the client computing device (e.g., client computing device 150) with a clock maintained by the computing platform (e.g., client authentication computing platform 110).

In some embodiments, the time-based one-time passcode may be generated by the client computing device after the client computing device synchronizes a clock maintained by the client computing device with a clock maintained by a time server. For example, the time-based one-time passcode (which may, e.g., be included in the authentication request received by client authentication computing platform 110 from client computing device 150 at step 209) may be generated by the client computing device (e.g., client computing device 150) after the client computing device (e.g., client computing device 150) synchronizes a clock maintained by the client computing device (e.g., client computing device 150) with a clock maintained by a time server (e.g., an internet time server and/or the like).

At step 210, client authentication computing platform 110 may generate a validation token. For example, at step 210, in response to receiving the request to authenticate the user to the user account associated with the client portal provided by the client portal server (e.g., client portal server 120) from the client computing device (e.g., client computing device 150) at step 209, client authentication computing platform 110 may generate a validation token for the user account associated with the client portal provided by the client portal server (e.g., client portal server 120).

In some embodiments, generating the validation token for the user account associated with the client portal provided by the client portal server may include generating a validation passcode based on a current time and a stored user account password associated with the user account associated with the client portal provided by the client portal server. For example, in generating the validation token for the user account associated with the client portal provided by the client portal server (e.g., client portal server 120) at step 210, client authentication computing platform 110 may generate a validation passcode based on a current time (e.g., the current system time maintained by client authentication computing platform 110) and a stored user account password associated with the user account associated with the client portal provided by the client portal server (e.g., client portal server 120). The stored user account password may, for instance, have been stored by client authentication computing platform 110 at step 203, as discussed above.

At step 211, client authentication computing platform 110 may validate the authentication request received from client computing device 150. For example, at step 211, client authentication computing platform 110 may validate the request to authenticate the user to the user account associated with the client portal provided by the client portal server (e.g., client portal server 120) received from the client computing device (e.g., client computing device 150) based on the validation token generated for the user account associated with the client portal provided by the client portal server (e.g., client portal server 120). In validating the authentication request, client authentication computing platform 110 may, for instance, determine whether the validation token generated by client authentication computing platform 110 matches the one-time passcode included in the authentication request received from client computing device 150. If the validation token matches the one-time passcode, client authentication computing platform 110 may determine that the validation is successful and the event sequence may continue as illustrated in the example event sequence shown in FIG. 2C. Alternatively, if the validation token does not match the one-time passcode, client authentication computing platform 110 may determine that the validation has failed and may send one or more error messages, as discussed below, instead of continuing as illustrated.

In some embodiments, validating the request to authenticate the user to the user account associated with the client portal provided by the client portal server may include comparing the validation token generated for the user account associated with the client portal provided by the client portal server with a time-based one-time passcode generated by the client computing device. For example, in validating the request to authenticate the user to the user account associated with the client portal provided by the client portal server (e.g., client portal server 120) at step 211, client authentication computing platform 110 may compare the validation token generated (e.g., by client authentication computing platform 110 at step 210) for the user account associated with the client portal provided by the client portal server (e.g., client portal server 120) with a time-based one-time passcode generated by the client computing device (e.g., client computing device 150). For instance, client authentication computing platform 110 may compare the validation token generated by client authentication computing platform 110 at step 210 with the one-time passcode included in the authentication request received from client computing device 150.

In some embodiments, in response to failing to validate the request to authenticate the user to the user account associated with the client portal provided by the client portal server (e.g., client portal server 120) received from the client computing device (e.g., client computing device 150) based on the validation token generated for the user account associated with the client portal provided by the client portal server (e.g., client portal server 120) at step 211, client authentication computing platform 110 may send at least one error message to the client computing device (e.g., client computing device 150). For instance, if validation fails at step 211, client authentication computing platform 110 may generate and send one or more error messages to client computing device 150 and/or one or more other devices. Alternatively, if validation succeeds at step 211, the example event sequence may continue to step 212, as discussed below.

At step 212, client authentication computing platform 110 may generate one or more portal interface commands (e.g., based on validating the authentication request at step 211), and such portal interface commands may direct client portal server 120 to generate and/or provide one or more portal user interfaces to client computing device 150. For example, at step 212, in response to validating the request to authenticate the user to the user account associated with the client portal provided by the client portal server (e.g., client portal server 120) received from the client computing device (e.g., client computing device 150) based on the validation token generated for the user account associated with the client portal provided by the client portal server (e.g., client portal server 120), client authentication computing platform 110 may generate one or more commands directing the client portal server (e.g., client portal server 120) to provide at least one client portal interface to the client computing device (e.g., client computing device 150).

Figure 2D:
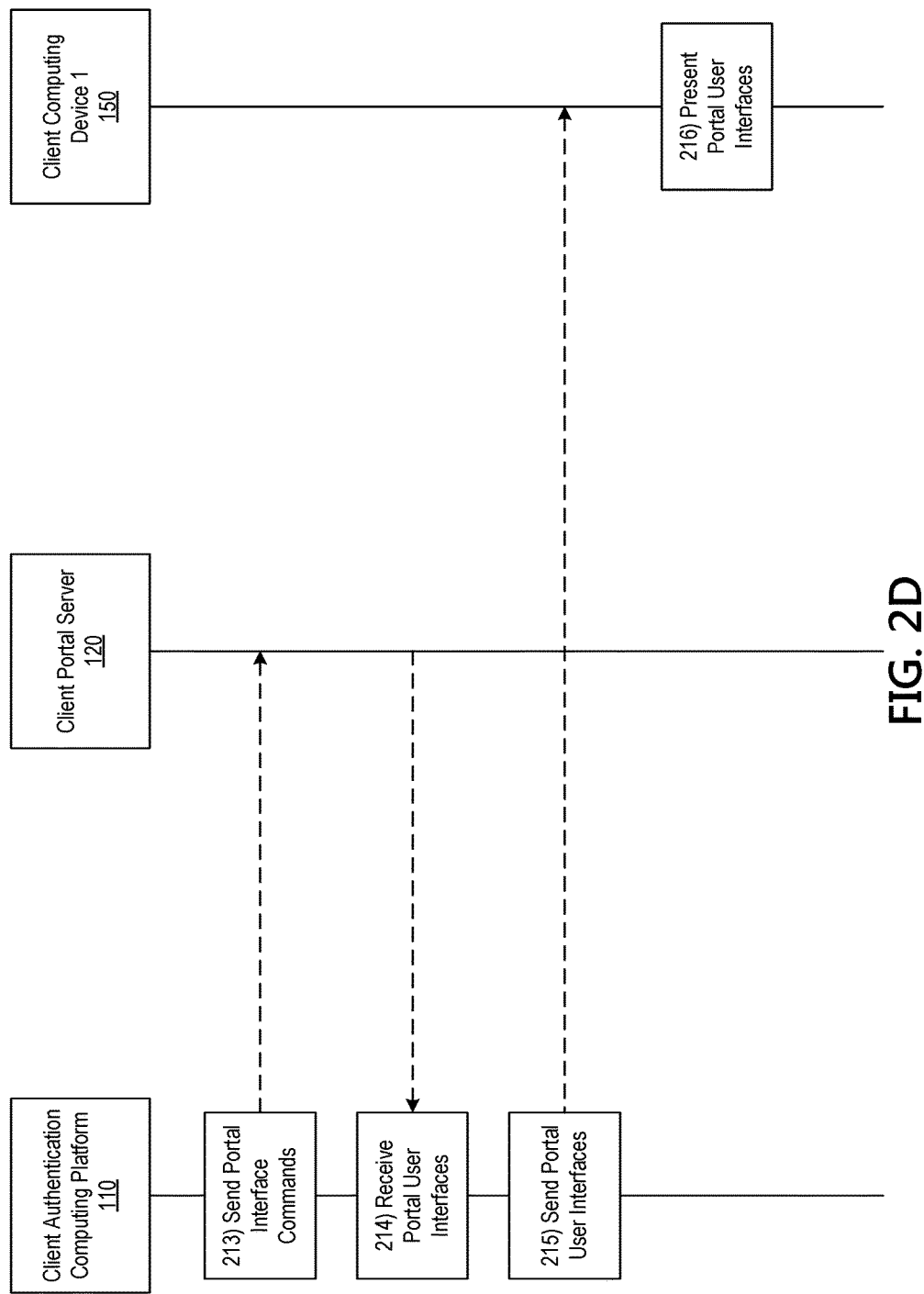

Referring to FIG. 2D, at step 213, client authentication computing platform 110 may send the one or more portal interface commands to client portal server 120. For example, at step 213, client authentication computing platform 110 may send, via the communication interface (e.g., communication interface 115), to the client portal server (e.g., client portal server 120), the one or more commands directing the client portal server (e.g., client portal server 120) to provide the at least one client portal interface to the client computing device (e.g., client computing device 150).

At step 214, client authentication computing platform 110 may receive one or more portal user interfaces from client portal server 120. For example, at step 214, client authentication computing platform 110 may receive, via the communication interface (e.g., communication interface 115), from the client portal server (e.g., client portal server 120), one or more client portal user interfaces generated by the client portal server (e.g., client portal server 120) for the client computing device (e.g., client computing device 150).

At step 215, client authentication computing platform 110 may send the one or more portal user interfaces to client portal server 120. For example, at step 215, client authentication computing platform 110 may send, via the communication interface (e.g., communication interface 115), to the client computing device (e.g., client computing device 150), the one or more client portal user interfaces generated by the client portal server (e.g., client portal server 120) for the client computing device (e.g., client computing device 150).

Figure 4:
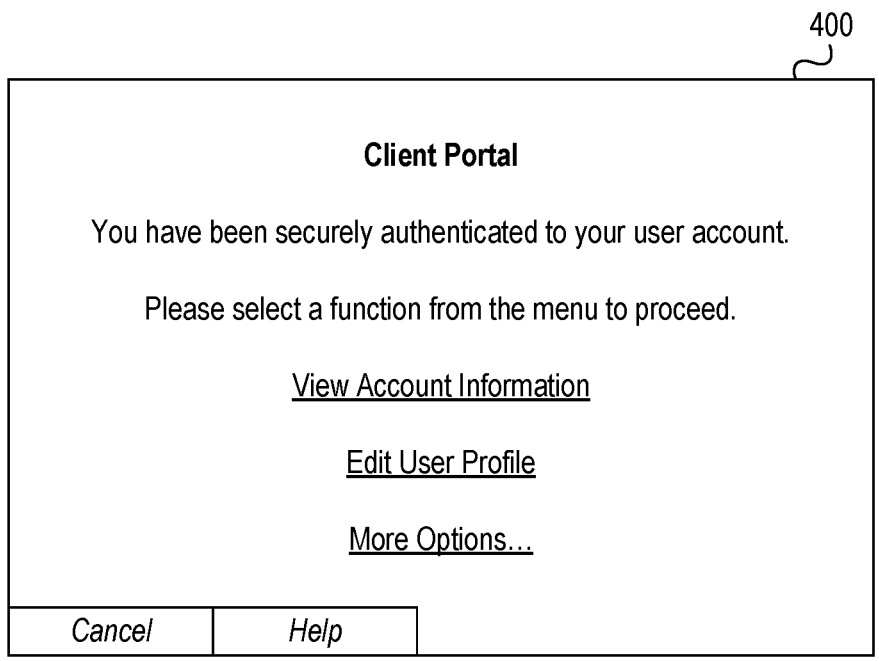

At step 216, client computing device 150 may present the one or more portal user interfaces. For example, at step 216, client computing device 150 may present the one or more client portal user interfaces generated by client portal server 120 after being authenticated by client authentication computing platform 110. In presenting the one or more client portal user interfaces generated by client portal server 120, client computing device 150 may display and/or otherwise present a graphical user interface similar to graphical user interface 400, which is illustrated in FIG. 4. As seen in FIG. 4, graphical user interface 400 may include information indicating that the user of client computing device 150 has been securely authenticated to the user account and/or prompting the user of client computing device 150 to select a function from a menu to use the portal provided by client portal server 120 (e.g., "Please select a function from the menu to proceed. View Account Information. Edit User Profile. More Options."). In addition, graphical user interface 400 may include one or more controls and/or other elements enabling a user of graphical user interface 400 and/or client computing device 150 to respond to the prompt (e.g., one or more links, a cancel button, a help button, and/or the like).

Figure 5:
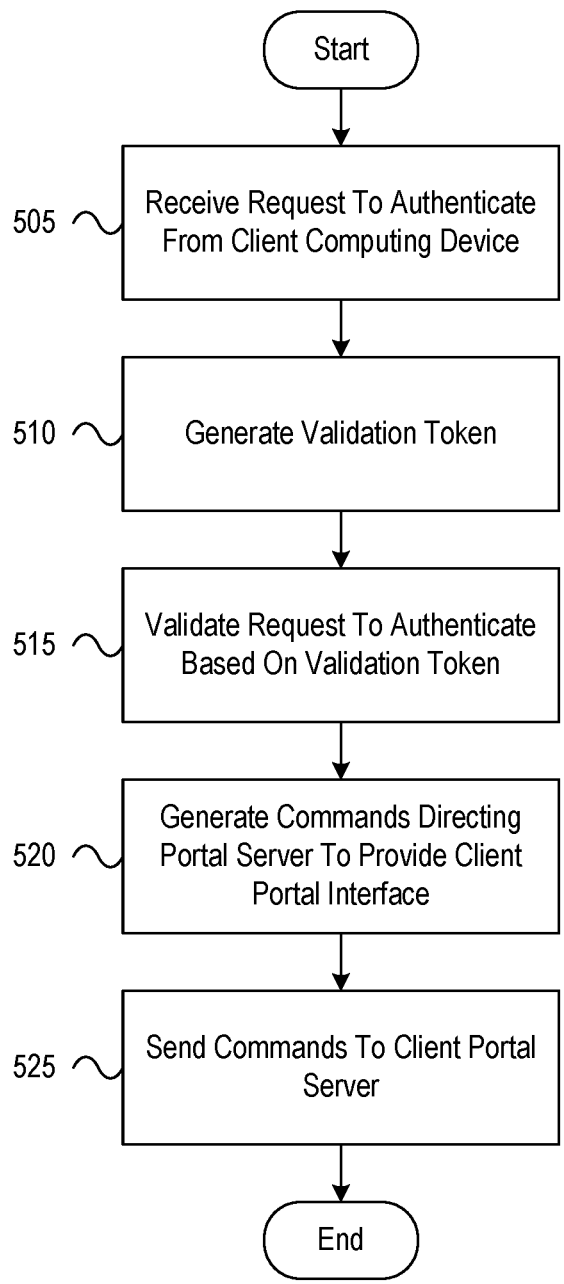
FIG. 5 depicts an illustrative method for preventing unauthorized access to secured information systems using authentication tokens in accordance with one or more example embodiments.

FIG. 5 depicts an illustrative method for preventing unauthorized access to secured information systems using authentication tokens in accordance with one or more example embodiments. Referring to FIG. 5, at step 505, a computing platform having at least one processor, a communication interface, and a memory may receive, via the communication interface, from a client computing device, a request to authenticate a user to a user account associated with a client portal provided by a client portal server. At step 510, in response to receiving the request to authenticate the user to the user account associated with the client portal provided by the client portal server from the client computing device, the computing platform may generate a validation token for the user account associated with the client portal provided by the client portal server.

At step 515, the computing platform may validate the request to authenticate the user to the user account associated with the client portal provided by the client portal server received from the client computing device based on the validation token generated for the user account associated with the client portal provided by the client portal server. At step 520, in response to validating the request to authenticate the user to the user account associated with the client portal provided by the client portal server received from the client computing device based on the validation token generated for the user account associated with the client portal provided by the client portal server, the computing platform may generate one or more commands directing the client portal server to provide at least one client portal interface to the client computing device. At step 525, the computing platform may send, via the communication interface, to the client portal server, the one or more commands directing the client portal server to provide the at least one client portal interface to the client computing device.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:

at least one processor;

a communication interface communicatively coupled to the at least one processor; and memory storing computer-readable instructions that, when executed by the at least one processor, cause the computing platform to:

receive profile information defining a new user account password for a user account associated with a client portal provided by a client portal server during an authenticated session;

store the new user account password for the user account associated with the client portal provided by the client portal server;

in response to receiving the profile information defining the new user account password for the user account associated with the client portal provided by the client portal server during the authenticated session, send, via the communication interface, to a client computing device, at least one clock synchronization command directing the client computing device to synchronize a clock maintained by the client computing device with a clock maintained by another server;

receive, via the communication interface, from the client computing device, a request to authenticate a user to the user account associated with the client portal provided by the client portal server, wherein receiving the request to authenticate the user to the user account associated with the client portal provided by the client portal server comprises receiving a username corresponding to the user account and a time-based one-time passcode generated by the client computing device;

in response to receiving the request to authenticate the user to the user account associated with the client portal provided by the client portal server from the client computing device, generate a validation token for the user account associated with the client portal provided by the client portal server;

validate the request to authenticate the user to the user account associated with the client portal provided by the client portal server received from the client computing device based on the validation token generated for the user account associated with the client portal provided by the client portal server;

in response to validating the request to authenticate the user to the user account associated with the client portal provided by the client portal server received from the client computing device based on the validation token generated for the user account associated with the client portal provided by the client portal server, generate one or more commands directing the client portal server to provide at least one client portal interface to the client computing device; and send, via the communication interface, to the client portal server, the one or more commands directing the client portal server to provide the at least one client portal interface to the client computing device.

2. The computing platform of claim 1, wherein the time-based one-time passcode is generated by the client computing device based on password input received by the client computing device.

3. The computing platform of claim 1, wherein the time-based one-time passcode is generated by the client computing device after the client computing device synchronizes the clock maintained by the client computing device with a clock maintained by the computing platform.

4. The computing platform of claim 1, wherein the time-based one-time passcode is generated by the client computing device after the client computing device synchronizes the clock maintained by the client computing device with a clock maintained by a time server.

5. The computing platform of claim 1, wherein generating the validation token for the user account associated with the client portal provided by the client portal server comprises generating a validation passcode based on a current time and a stored user account password associated with the user account associated with the client portal provided by the client portal server.

6. The computing platform of claim 1, wherein validating the request to authenticate the user to the user account associated with the client portal provided by the client portal server comprises comparing the validation token generated for the user account associated with the client portal provided by the client portal server with the time-based one-time passcode generated by the client computing device.

7. The computing platform of claim 1, wherein the memory stores additional computer-readable instructions that, when executed by the at least one processor, cause the computing platform to:

in response to failing to validate the request to authenticate the user to the user account associated with the client portal provided by the client portal server received from the client computing device based on the validation token generated for the user account associated with the client portal provided by the client portal server, send at least one error message to the client computing device.

8. The computing platform of claim 1, wherein the memory stores additional computer-readable instructions that, when executed by the at least one processor, cause the computing platform to:

receive, via the communication interface, from the client portal server, one or more client portal user interfaces generated by the client portal server for the client computing device; and send, via the communication interface, to the client computing device, the one or more client portal user interfaces generated by the client portal server for the client computing device.

9. A method, comprising:

at a computing platform comprising at least one processor, memory, and a communication interface:

receiving, by the at least one processor, profile information defining a new user account password for a user account associated with a client portal provided by a client portal server during an authenticated session;

storing, by the at least one processor, the new user account password for the user account associated with the client portal provided by the client portal server;

in response to receiving the profile information defining the new user account password for the user account associated with the client portal provided by the client portal server during the authenticated session, sending, by the at least one processor, via the communication interface, to a client computing device, at least one clock synchronization command directing the client computing device to synchronize a clock maintained by the client computing device with a clock maintained by another server;

receiving, by the at least one processor, via the communication interface, from the client computing device, a request to authenticate a user to the user account associated with the client portal provided by the client portal server, wherein receiving the request to authenticate the user to the user account associated with the client portal provided by the client portal server comprises receiving a username corresponding to the user account and a time-based one-time passcode generated by the client computing device;

in response to receiving the request to authenticate the user to the user account associated with the client portal provided by the client portal server from the client computing device, generating, by the at least one processor, a validation token for the user account associated with the client portal provided by the client portal server;

validating, by the at least one processor, the request to authenticate the user to the user account associated with the client portal provided by the client portal server received from the client computing device based on the validation token generated for the user account associated with the client portal provided by the client portal server;

in response to validating the request to authenticate the user to the user account associated with the client portal provided by the client portal server received from the client computing device based on the validation token generated for the user account associated with the client portal provided by the client portal server, generating, by the at least one processor, one or more commands directing the client portal server to provide at least one client portal interface to the client computing device; and sending, by the at least one processor, via the communication interface, to the client portal server, the one or more commands directing the client portal server to provide the at least one client portal interface to the client computing device.

10. The method of claim 9, wherein the time-based one-time passcode is generated by the client computing device based on password input received by the client computing device.

11. The method of claim 9, wherein the time-based one-time passcode is generated by the client computing device after the client computing device synchronizes the clock maintained by the client computing device with a clock maintained by the computing platform.

12. The method of claim 9, wherein the time-based one-time passcode is generated by the client computing device after the client computing device synchronizes the clock maintained by the client computing device with a clock maintained by a time server.

13. The method of claim 9, wherein generating the validation token for the user account associated with the client portal provided by the client portal server comprises generating a validation passcode based on a current time and a stored user account password associated with the user account associated with the client portal provided by the client portal server.

14. The method of claim 9, wherein validating the request to authenticate the user to the user account associated with the client portal provided by the client portal server comprises comparing the validation token generated for the user account associated with the client portal provided by the client portal server with the time-based one-time passcode generated by the client computing device.

15. One or more non-transitory computer-readable media storing instructions that, when executed by a computing platform comprising at least one processor, memory, and a communication interface, cause the computing platform to:
receive profile information defining a new user account password for a user account associated with a client portal provided by a client portal server during an authenticated session;
store the new user account password for the user account associated with the client portal provided by the client portal server;
in response to receiving the profile information defining the new user account password for the user account associated with the client portal provided by the client portal server during the authenticated session, send, via the communication interface, to a client computing device, at least one clock synchronization command directing the client computing device to synchronize a clock maintained by the client computing device with a clock maintained by another server;
receive, via the communication interface, from the client computing device, a request to authenticate a user to the user account associated with the client portal provided by the client portal server, wherein receiving the request to authenticate the user to the user account associated with the client portal provided by the client portal server comprises receiving a username corresponding to the user account and a time-based one-time passcode generated by the client computing device;
in response to receiving the request to authenticate the user to the user account associated with the client portal provided by the client portal server from the client computing device, generate a validation token for the user account associated with the client portal provided by the client portal server;
validate the request to authenticate the user to the user account associated with the client portal provided by the client portal server received from the client computing device based on the validation token generated for the user account associated with the client portal provided by the client portal server;
in response to validating the request to authenticate the user to the user account associated with the client portal provided by the client portal server received from the client computing device based on the validation token generated for the user account associated with the client portal provided by the client portal server, generate one or more commands directing the client portal server to provide at least one client portal interface to the client computing device; and
send, via the communication interface, to the client portal server, the one or more commands directing the client portal server to provide the at least one client portal interface to the client computing device.

16. The computing platform of claim 1, wherein the new user account password for the user account associated with the client portal provided by the client portal server is used as a seed by the computing platform in generating a time-based token used in validating the time-based one-time passcode generated by the client computing device.

17. The computing platform of claim 16, wherein the time-based one-time passcode generated by the client computing device replaces a password in the request to authenticate the user to the user account.

18. The method of claim 9, wherein the new user account password for the user account associated with the client portal provided by the client portal server is used as a seed by the computing platform in generating a time-based token used in validating the time-based one-time passcode generated by the client computing device.

19. The method of claim 18, wherein the time-based one-time passcode generated by the client computing device replaces a password in the request to authenticate the user to the user account.

20. The one or more non-transitory computer-readable media of claim 15, wherein the new user account password for the user account associated with the client portal provided by the client portal server is used as a seed by the computing platform in generating a time-based token used in validating the time-based one-time passcode generated by the client computing device.

* * * * *